March 8, 1927.

B. F. TARMAN

SHIPPING CRATE FOR ANIMALS

Filed Aug. 3, 1926

Inventor

B. F. Tarman

By Lacey & Lacey, Attorneys

March 8, 1927.

B. F. TARMAN 1,619,895

SHIPPING CRATE FOR ANIMALS

Filed Aug. 3, 1926

Inventor

B.F. Tarman

By Lacey & Lacey, Attorneys

Patented Mar. 8, 1927.

1,619,895

UNITED STATES PATENT OFFICE.

BENJAMIN F. TARMAN, OF QUINCY, PENNSYLVANIA.

SHIPPING CRATE FOR ANIMALS.

Application filed August 3, 1926. Serial No. 126,896.

This invention relates to shipping crates and more particularly to a crate in which small animals may be shipped from one place to another.

One object of the invention is to provide a crate in which the animals may be safely shipped from one place to another without danger of being smothered even though the crate should be placed close to steam pipes or along the walls of a freight car, or the like.

Another object of the invention is to so locate the ventilating portion of the crate that passage of air into the animal receiving compartment will not be interferred with or cut off should several crates be stacked one upon another.

Another object of the invention is to provide a crate having a number of compartments into which the animals may be placed or from which they may be removed without danger of their escaping.

Another object of the invention is to divide the interior of the crate into a plurality of compartments by longitudinally and transversely extending partitions which are interlocked and not liable to move out of proper relation to each other.

Another object of the invention is to provide the crate with a single food trough divided by the longitudinally and transversely extending partitions into sections so that food may be placed in the trough for consumption by the animals in the various compartments.

This invention is illustrated in the accompanying drawings, wherein,—

Figure 1:
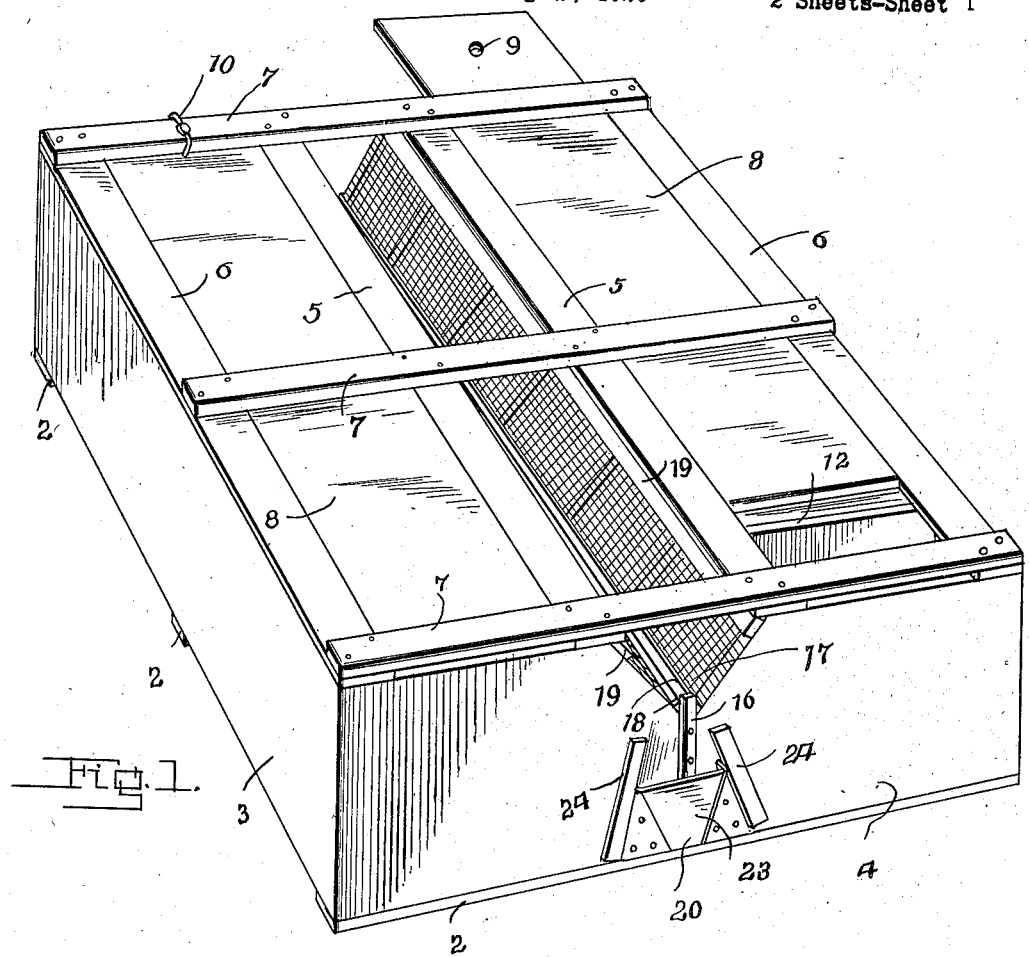
Figure 1 is a perspective view of the improved crate.

The crate constituting the subject matter of this invention is preferably formed of wood, although other material, such as sheet metal, or the like may be employed, if so desired. The bottom of the crate consists of separate side sections 1, secured in spaced relation to each other by cross strips 2. The side and end walls 3 and 4 extend upwardly from the bottom and carry longitudinally extending strips 5 and 6 which are spaced from each other transversely of the crate and secured to the walls by nails or any other suitable fasteners. Cross strips 7 extend across the strips 5 and 6 and together with the strips 5 and 6 form a top for the crate. It will be noted that the strips 5 are spaced from each other and also spaced from the strips 6, and together with the strips 6 constitute guides for sliding covers 8 which are to be moved longitudinally of the crate beneath the cross strips 7 into and out of covering relation to compartments formed in the crate. Each of the covers has been shown provided with an opening 9 in one end so that a sealing wire 10 may be passed through it and about one of the cross bars 7 to secure the cover closed, but it will be understood that any other locking means may be substituted to securely but releasably hold the covers shut.

Figure 5:
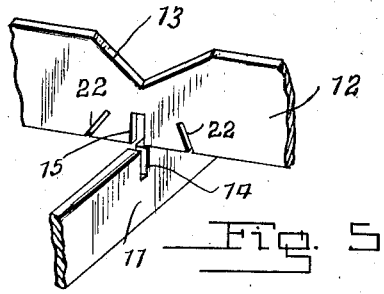
Figure 5 is a fragmentary perspective view of the longitudinally extending partition and one of the transversely extending partitions.

In order to divide the body portion of the crate into separate compartments there has been provided a longitudinally extending partition 11 and transversely extending partitions 12. The transversely extending partitions and the end walls 4 are formed with V-shaped recesses 13 intermediate the width of the crate and the longitudinally extending partition is of a height corresponding to the distance from the floor, or bottom of the crate to the tapered lower ends of the recesses. It should also be noted that the partitions 11 and 12 are formed with cooperating slots 14 and 15, as shown in Figure 5, so that the transverse partitions may be placed in crossed and interlocked engagement with the longitudinally extending partition. The longitudinally extending partition has its end portions reduced and passed through openings formed in the end walls 4 and the reduced end portions carry strips 16 which extend upwardly and are nailed or otherwise rigidly secured against the outer faces of the end walls. By this arrangement the longitudinally extending partition will be firmly held in place and will serve not only as a partition to divide the crate into separated side sections, but also as a spacer to hold the transverse compartment forming partitions in proper spaced relation to each other. The transverse partitions may be secured to the side walls and bottom of the crate by nails or other suitable fasteners if so desired. In order to divide the adjacent inner end walls of the compartments with ventilator sections, there have been provided strips of wire 17 which extend longitudinally of the crate between the upper edge of the longitudinally extending partition and the inner top forming strips 5. These strips of wire which may be referred to as grating members are secured against the edges of the recesses 13 in the end walls and partitions 12 by strips 18 and 19. It will thus be seen that each of the compartments has its inner end provided with a wall having its upper portion perforated so that air may be supplied to the compartment. It will be further noted that when crates are stacked one upon another, the depressed portions which constitute the ventilators will provide tunnel-like spaces so that air can circulate between the stacked crates and supply the animals in the compartments with the necessary air.

Figure 2:
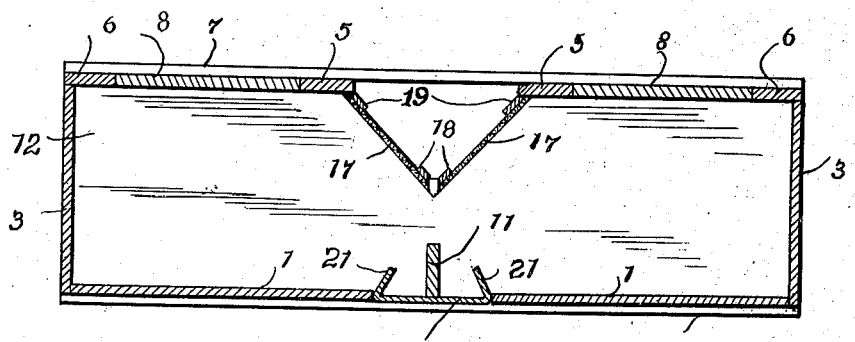
Figure 2 is a transverse sectional view through the crate.
Figure 3:
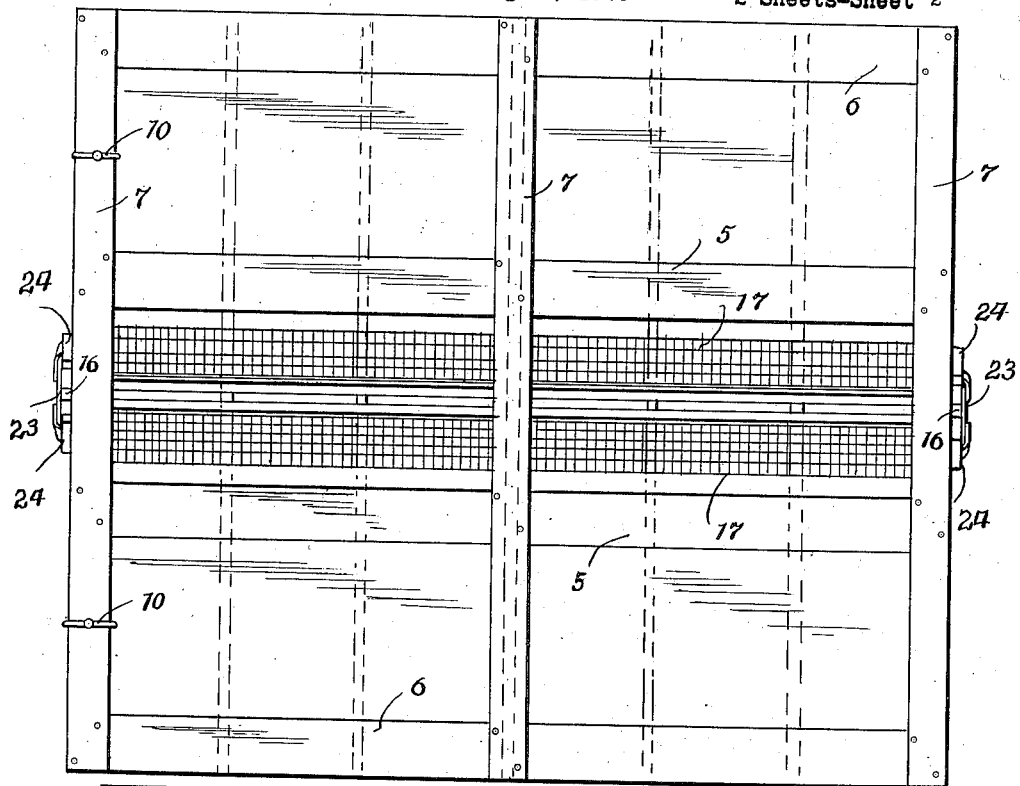
Figure 3 is a top plan view of the crate.
Figure 4:
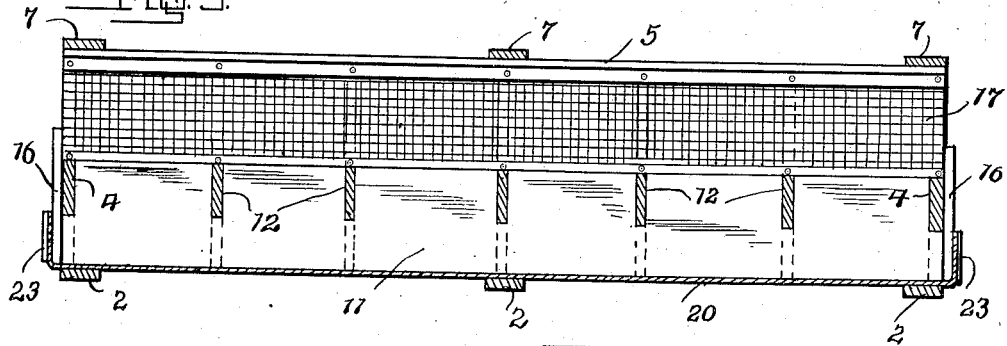
Figure 4 is a longitudinal sectional view through the crate.

While the animals are being transported from one place to another, it is necessary that they be supplied with sufficient food to prevent them from starving during the trip. I have, therefore, provided a feed pan, or trough 20, which is preferably formed of sheet metal. The trough extends longitudinally through the crate between the spaced bottom sections 1, as shown in Figure 2. Referring to this figure, it will be seen that the trough is bisected by the partition 11 and at its sides is formed with walls 21 which fit into slots 22 formed in the partitions 12 and projects through similar slots formed in the end walls 4. The end portions of the trough are bent upwardly and the projected ends of its side walls are folded inwardly and secured to provide end walls 23 and in order to brace the projecting ends of the feed pan or trough, and prevent it from being accidentally broken there have been provided strips 24 which are secured against the end walls of the crate at opposite sides of the trough.

When the crate is in use the sliding covers are released and moved to an open position. The rabbits or other animals to be shipped are placed one at a time into separate compartments and the cover moved longitudinally into covering relation to the compartments, as the animals are placed therein. After the last animal has been put into a compartment and the cover completely closed the sealing wire, or other locking means is applied and the other side of the crate filled in a like manner. Food will, of course, be placed in the feed pan before the animals are placed in the compartments. When the crate reaches its destination, it is merely necessary to release the fasteners of the covers and slide them longitudinally to an open position. Each animal will be removed as its compartment is uncovered. It will thus be seen that there will be no danger of some of the animals escaping. It will be obvious that if desired the transverse compartments could be reduced in number in order to provide compartments to receive larger animals than rabbits or the like.

Having thus described the invention, I claim:

1. An animal crate comprising a body portion divided into a plurality of non-communicating compartments and having its top formed with a depressed ventilating portion common to all of the compartments.

2. An animal crate comprising a body portion having partitions dividing the body into a plurality of non-communicating compartments, said body being provided with a ventilating portion common to all of the compartments.

3. An animal crate comprising a body portion having compartments therein disposed in facing relation to each other and at their adjacent ends provided with perforated end wall portions spaced from each other and constituting ventilators.

4. An animal crate comprising a body portion, a partition dividing said body into separate compartments, said partition being of less height than said body, the top of the body terminating in spaced relation to opposite sides of the partition, and gratings extending from said partition to the separated portions of said top and constituting ventilators for said compartments.

5. An animal crate comprising a body portion, a partition dividing said body into separate compartments, said partition being of less height than said body, and gratings extending upwardly from said partition and forming perforated upper wall portions spaced from each other and constituting ventilators.

6. An animal crate comprising a body portion, a partition dividing said body into separate compartments, said partition being of less height than said body, gratings extending upwardly from said partition and forming perforated upper wall portions spaced from each other and constituting ventilators, and a trough extending beneath the said partition and constituting food holders in the compartments at opposite sides of the partition.

7. An animal crate comprising a body portion, a partition extending longitudinally in said body and terminating below the plane of its top, other partitions extending transversely in said body and dividing the interior thereof into separate compartments at opposite sides of the longitudinally extending partition, portions of the transverse partitions and end walls of said body adjacent the longitudinal partition being recessed from their upper edges to provide a depressed passage extending longitudinally of the body and open at its top ends, and gratings forming sides for the tunnel and constituting ventilators forming inner end wall portions for said compartments above the longitudinally extending partition.

8. An animal crate comprising a body portion, a partition extending longitudinally in said body and terminating below the plane of its top, other partitions extending transversely in said body and dividing the interior thereof into separate compartments at opposite sides of the longitudinally extending partition, the top of said body portion terminating in spaced relation to opposite sides of the longitudinally extending partition, and gratings extending between said longitudinally extending partition and the said spaced side portions of said top and constituting ventilators for the inner ends of said compartments.

9. An animal crate comprising a body portion, a partition extending longitudinally in said body and terminating below the plane of its top, other partitions extending transversely in said body and dividing the interior thereof into separate compartments at opposite sides of the longitudinally extending partition, the top of said body portion terminating in spaced relation to opposite sides of the longitudinally extending partition, and gratings extending between said longitudinally extending partition and the said spaced side portions of said top and constituting ventilators for the inner ends of said compartments, each side portion of the cover including a closure forming section slidable into and out of closing relation to the upper ends of said compartments and reinforcing strips extending transversely across said body, the closure forming sections being adapted to be secured to certain of said reinforcing strips to retain the closure sections closed.

In testimony whereof I affix my signature.

BENJAMIN F. TARMAN. [L. S.]